United States Patent
Takematsu et al.

(10) Patent No.: US 8,734,961 B2
(45) Date of Patent: May 27, 2014

(54) NICKEL-PLATED STEEL SHEET AND PROCESS FOR PRODUCING BATTERY CAN USING THE NICKEL-PLATED STEEL SHEET

(75) Inventors: Shinichi Takematsu, Yamaguchi (JP); Eiji Okamatsu, Yamaguchi (JP); Hideyuki Minagi, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 403 days.

(21) Appl. No.: 13/377,258

(22) PCT Filed: May 31, 2010

(86) PCT No.: PCT/JP2010/003642
§ 371 (c)(1), (2), (4) Date: Mar. 21, 2012

(87) PCT Pub. No.: WO2010/143374
PCT Pub. Date: Dec. 16, 2010

(65) Prior Publication Data
US 2012/0171518 A1   Jul. 5, 2012

(30) Foreign Application Priority Data
Jun. 9, 2009  (JP) ................. 2009-138540

(51) Int. Cl.
C25D 5/50 (2006.01)
H01M 2/02 (2006.01)
B21B 1/22 (2006.01)
B21D 51/26 (2006.01)
C25D 5/16 (2006.01)
C25D 3/12 (2006.01)
C25D 7/00 (2006.01)

(52) U.S. Cl.
CPC .............. *B21B 1/227* (2013.01); *B21D 51/26* (2013.01); *H01M 2/02* (2013.01); *C25D 5/50* (2013.01); *C25D 3/12* (2013.01); *C25D 5/16* (2013.01); *C25D 7/00* (2013.01)
USPC ........... 428/679; 428/687; 148/518; 148/530; 148/537; 72/47; 205/228; 429/176; 29/527.2

(58) Field of Classification Search
None
See application file for complete search history.

(56) References Cited

U.S. PATENT DOCUMENTS 5,576,113 A    11/1996  Hirofumi et al.
2008/0292957 A1 *  11/2008  Tomomori et al. .......... 429/176

(Continued)

FOREIGN PATENT DOCUMENTS

EP    0629009 A1 * 12/1994
JP    61-235594 A  10/1986

(Continued)

*Primary Examiner* — John J Zimmerman
(74) *Attorney, Agent, or Firm* — Browdy and Neimark, PLLC

(57) ABSTRACT

A Ni-plated steel sheet is provided in which the occurrence of scratches at the time of forming a battery can is suppressed. Also provided is a method which includes a step where a surface of a steel sheet is plated with Ni in a Ni adhesion amount of 0.3-2 μm, a step where the Ni-plated steel sheet is heated to 600-800° C. to form an Fe–Ni diffusion layer as an outermost surface layer, and a step where the steel sheet is rolled by temper rolling so as to adjust the Fe–Ni diffusion layer so that the steel sheet has the surface roughness Ra of 0.9-2.0 μm and the surface roughness Ry of 4.0-15 μm. A Ni-plated steel sheet which includes an Fe–Ni diffusion layer as an outermost surface layer and in which the diffusion layer has the surface roughness Ra of 0.9-2.0 μm and the surface roughness Ry of 4.0-15 μm and the diffusion layer has such an Fe/Ni ratio that the Fe accounts for 20-50% in Auger analysis is subjected to drawing using a water-soluble liquid which contains water-soluble emersion as a press lubricant.

4 Claims, 1 Drawing Sheet

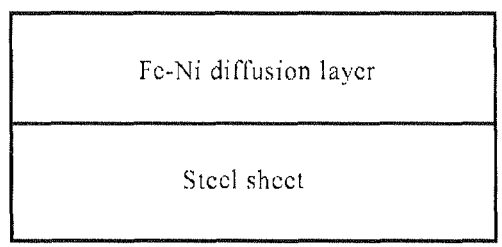

(56) References Cited

U.S. PATENT DOCUMENTS

2009/0269661 A1* 10/2009 Mori et al. .................... 429/166
2009/0311595 A1    12/2009 Mori et al.
2012/0219825 A1*  8/2012 Minagi et al. ................. 428/679
2013/0209867 A1*  8/2013 Minagi et al. ................. 429/176

FOREIGN PATENT DOCUMENTS

| | | | |
|---|---|---|---|
| JP | 3045612 | A | 2/1991 |
| JP | 6-346282 | A | 12/1994 |
| JP | 2005-85480 | * | 3/2005 |
| JP | 2005-149735 | A | 6/2005 |
| JP | 2007-335205 | A | 12/2007 |
| JP | 2008-41527 | A | 2/2008 |

* cited by examiner

Fig. 1

Surface which forms outer surface side of can

| Fe-Ni diffusion layer |
|---|
| Steel sheet |

Exposure rate of Fe :
    20 ~ 50 %

Surface which forms outer surface side of can

| Fe-Ni diffusion layer |
|---|
| Steel sheet |

Exposure rate of Fe :
    Less than 20%

Ra : Less than 0.9 $\mu$m

Ry : Less than 4.0 $\mu$m

NICKEL-PLATED STEEL SHEET AND PROCESS FOR PRODUCING BATTERY CAN USING THE NICKEL-PLATED STEEL SHEET

TECHNICAL FIELD

The present invention relates to a Ni-plated steel sheet where the occurrence of scratches at the time of forming a battery can is suppressed and a method of manufacturing a battery can using the Ni-plated steel sheet.

BACKGROUND ART

Conventionally, a Ni-plated steel sheet has been popularly used for manufacturing a battery can.

Also, to further enhance the corrosion resistance of a Ni-plated steel sheet, after Ni plating, Ni is diffused in the steel sheet by heat treatment.

For example, patent document 1 (JP-A-61-235594) discloses a Ni-plated steel sheet where Ni plating is applied to a steel sheet at an adhesion amount of 9 to 62 g/m$^2$ for one-side surface before diffusion by heating and, thereafter, heat treatment is applied to the steel sheet thus forming an Fe–Ni alloy layer having a thickness of 4 μm or less on the steel sheet, and a method of manufacturing such a Ni-plated steel sheet.

Further, patent documents 2 (Japanese Patent 3045612) discloses an Ni-plated steel sheet used for manufacturing a battery can where a Ni-plating layer is formed on a cold-rolled steel sheet and, thereafter, thermal diffusion treatment is applied to the steel sheet thus turning the Ni-plating layer into an Fe–Ni diffusion layer.

PRIOR ART DOCUMENT

Patent Document

Patent document 1: JP-A-61-235594
Patent document 2: Japanese Patent 3045612

SUMMARY OF THE INVENTION

Problems that the Invention is to Solve

However, the Ni-plated steel sheets disclosed in the above-mentioned patent document 1 and 2 have the Fe–Ni diffusion layer which is obtained by diffusion by heating on an outermost surface layer and hence, scratches are generated on an outer surface of a battery can in a press operation where a press fluid used as a lubricant in a drawing step is formed of a water-soluble emulsion-based fluid thus giving rise to a drawback in terms of quality.

Scratches are flaws which are generated on an outer surface wall of a can after forming the can and flaws which are generated linearly in the pressing direction. As the reason scratches are generated, it is considered that a substance which becomes a factor for generating flaws on a can wall adheres to a die of a mold. Particularly, in case of a Ni-plated steel sheet having a Fe–Ni diffusion layer, when the Ni-plated steel sheet is brought into contact with the mold, minute Ni powder adheres to the mold. It is thought that when a press operation is repeated several hundred thousand times, most of Ni is peeled off and falls. However, some Ni does not fall thus giving rise to a phenomenon where Ni adheres to Ni so that Ni gradually grows.

Further, once Ni adheres to the die of the mold, Ni is not peeled off even when the press operation is repeated thus giving rise to a phenomenon referred to as build-up where the adhered Ni gradually grows.

It is thought that Ni which adheres to the mold and is built up on the mold, in a stage where an adhered Ni grows to a certain size, generates flaws on a wall of a worked product (can) at the time of forming the product thus generating scratches on the wall.

Accordingly, it is an object of the present invention to overcome the above-mentioned conventional drawbacks and to provide a Ni-plated steel sheet which suppresses the generation of scratches at the time of forming a battery can.

It is another object of the present invention to provide a method of manufacturing a battery can using such an Ni-plated steel sheet.

Means for Solving the Problems (1) An Ni-plated steel sheet according to the present invention is a Ni-plated steel sheet having a Fe–Ni diffusion layer on an outermost surface layer, wherein
  a surface roughness Ra is 0.9 to 2.0 μm,
  a surface roughness Ry is 4.0 to 15 μm, and
  a ratio between Fe and Ni in the Fe–Ni diffusion layer is set such that Fe accounts for 20 to 50% in an Auger analysis.

(2) In the Ni-plated steel sheet according to the present invention in (1), the Ni-plated steel sheet is a Ni-plated steel sheet for manufacturing a battery can which is formed by drawing using a liquid which containing water-soluble emulsion as a press liquid.

(3) A method of manufacturing a Ni-plated steel sheet includes the steps of:
  applying Ni plating to a surface of a steel sheet with a Ni coating amount of 0.3 to 2 μm;
  forming a Fe–Ni diffusion layer on an outermost surface layer of the Ni-plated steel sheet by heating the Ni-plated steel sheet at a temperature of 600 to 800° C. such that a ratio between Fe and Ni in the Fe–Ni diffusion layer is set such that Fe accounts for 20 to 50% in an Auger analysis; and
  applying temper rolling to the steel sheet thus setting a surface roughness Ra of the Fe–Ni diffusion layer to 0.9 to 2.0 μm and a surface roughness Ry of the Fe–Ni diffusion layer to 4.0 to 15 μm.

(4) In a method of manufacturing a battery can according to the present invention, an Ni-plated steel sheet which has a Fe–Ni diffusion layer on an outermost surface layer and in which the Fe–Ni diffusion layer has a surface roughness Ra of 0.9 to 2.0 μm and a surface roughness Ry of 4.0 to 15 μm and the Fe–Ni diffusion layer has such a Fe/Ni ratio that Fe accounts for 20 to 50% in an Auger analysis is subjected to drawing using a water-soluble liquid which contains water-soluble emersion as a press lubricant.

Advantageous Effects of the Invention

The Ni-plated steel sheet of the present invention can prevent Ni from adhering to a mold and from being built up at the time of forming a battery can thus preventing the generation of scratches on the battery can.

Further, according the method of manufacturing a Ni-plated steel sheet of the present invention, it is possible to suppress the generation of scratches at the time of forming a battery can.

BRIEF DESCRIPTION OF THE DRAWINGS

FIG. 1 is a cross-sectional constitutional view of a Ni-plated steel sheet according to the present invention where scratches are not generated.

FIG. 2 is a cross-sectional constitutional view of a Ni-plated steel sheet of a comparison example where scratches are generated.

MODE FOR CARRYING OUT THE INVENTION

Hereinafter, an embodiment of the present invention is explained in detail.

<Steel Sheet>

Usually, a low carbon aluminum-killed hot-rolled coil is used as an original sheet of a Ni-plated steel sheet.

Further, a coil which is formed of extremely-low carbon steel which contains 0.003 weight % or less of carbon, or a coil which is formed of non-aging continuous cast steel manufactured by adding niobium and titanium to the extremely-low carbon steel.

<Pretreatment Before Plating>

As pretreatment before Ni plating, usually, a scale (oxide film) formed on a surface of a cold-rolled steel sheet is removed by applying electrolytic cleaning or cleaning by immersion to the cold-rolled sheet using an alkali solution containing caustic soda as a main agent. After the scale is removed, the steel sheet is rolled to a product thickness in a cold-rolling step.

<Annealing>

After rolling oil which adheres to the steel sheet in rolling is cleaned by electrolytic cleaning, the steel sheet is annealed.

Annealing may be performed by either one of continuous annealing and box annealing, and is not limited specifically.

After annealing is applied to the steel sheet, a shape of the steel sheet is modified.

<Ni Plating>

Next, Ni plating is applied to the steel sheet.

In general, although a Ni sulfate bath which is referred to as a watt bath is mainly used as a Ni plating bath, besides the Ni sulfamate plating bath, a sulfamic acid bath, a fluoroborate plating bath, a chloride bath or the like can be used. A coating amount of Ni plating in performing plating using these bathes is not specifically limited. However, to set an exposure ratio of Fe in a surface layer to a value which falls within a range from 20 to 50% in thermal diffusion treatment which is performed after plating, the coating amount of Ni is preferably set to 0.3 to 2.0 μm.

With respect to electrolysis conditions for acquiring the plating thickness, in a case where a typical watt bath is used, the plating thickness can be acquired under the electrolysis conditions where in a bath having the bath composition containing 200 to 350 g/l of Ni sulfate, 20 to 50 g/l of Ni chloride and 20 to 50 g/l of boric acid, pH is set to 3.6 to 4.6 and a bath temperature is set to 50 to 65° C., current density is set to 5 to 50 A/dm$^2$ and the number of coulomb is set to approximately 300 to 1500 c/dm$^2$.

Here, besides matte Ni plating where organic compounds are not added to a plating bath except for a pit suppressing agent, dull plating where an organic compound referred to as leveling agent which makes a precipitated crystal surface of a plating layer smooth is added to a plating bath, and bright Ni plating where an organic compound which contains sulfur component for making a plating layer glossy by making the Ni plating crystal structure fine by further adding a leveling agent is added to a plating bath are named. However, Ni plating where by an organic compound containing a sulfur component is added to a bath is not preferably adopted as Ni plating according to the present invention.

This is because a sulfur containing compound is contained in a plating layer in thermal diffusion treatment which is a next step after Ni plating and hence, brittleness is induced at the time of heat treatment thus deteriorating various properties such as corrosion resistance.

<Diffusion>

Next, heat treatment for forming a Fe–Ni diffusion layer is performed after Ni plating. This heat treatment is provided for increasing adhesiveness between base steel and a plating layer by softening and recrystallizing an extremely fine crystal state of Ni plating as it is, and also for controlling an exposure ratio of Fe in an uppermost surface layer of the Fe–Ni diffusion layer formed by heat treatment.

As a method for diffusing Ni by heat treatment, a method which uses a continuous annealing furnace or a method which uses a box-like annealing furnace is named. In the thermal diffusion method, usually, a Ni diffusion temperature falls within a range from 600° C. to 800° C., and Ni diffusion time falls within a range from 60 seconds to 12 hours. However, the Ni diffusion treatment may be performed for more than 12 hours. A gas atmosphere may be a non-oxidization gas atmosphere or a reduction protective gas atmosphere.

Further, in the present invention, as a heat treatment method by box annealing, preferably used is heat treatment which uses a protective gas consisting of 75% of hydrogen and 25% of nitrogen produced by an ammonia crack method referred to as hydrogen rich annealing with favorable heat transfer. In this method, favorable uniformity of temperature distribution is acquired in the inside of a steel strip in the longitudinal direction as well as in the widthwise direction of the steel strip and hence, the method has an advantageous effect that the irregularities of the Fe–Ni diffusion layer in the inside of the steel strip or the irregularities of the Fe–Ni diffusion layer between steel strips can be made small.

In diffusion treatment, by continuing heat treatment even after iron reaches an outermost surface, a ratio of iron exposed in an outermost layer can be increased.

Heat treatment conditions are variously changed correspondingly to respective plating thicknesses, and a thickness of a Fe–Ni diffusion layer is obtained by a method where the thickness is calculated based on a result obtained by a glow discharge atomic emission spectrochemical analysis (GDS analysis), while an Fe/(Fe+Ni) ratio is obtained by Auger electron spectroscopy. By carrying many experiments, a large number of samples where a Fe/(Fe+Ni) ratio of iron exposed on an outermost surface layer of the Ni-plated steel sheet is changed are prepared.

GDS analysis is a measuring method which acquires an analysis chart in the depth direction, and is a method where it is considered that an element exists when a peak intensity ratio between Fe and Ni falls within a range from a highest peak value to a value which is 1/10 of the highest peak value. Accordingly, even when Fe diffuses in a surface layer, so long as the intensity ratio between Fe and Ni is 1/10 of the highest value or below, the surface layer is recognized as a free Ni layer. A thickness of the Fe–Ni diffusion layer is obtained by calculation by comparing a GDS result of a sample to which plating is applied with the thermal diffusion treatment with a GDS result of a sample to which plating is applied without thermal diffusion treatment.

From the result of many experiments, it is found that by setting the Fe/(Fe+Ni) ratio of the outermost layer, that is, an exposure ratio of Fe in the plating outermost surface layer in respective plating thicknesses to values which fall within a range from 20% to 50%, build-up of Ni on a mold can be suppressed.

<Exposure Ratio of Fe in Fe–Ni Diffusion Layer>

When the Fe–Ni diffusion layer of the outermost surface layer is analyzed in an Auger analysis and the exposure ratio of Fe obtained in terms of Fe/(Fe+Ni)×100(%), it is found that the exposure ratio of Fe which does not generate scratches caused by build-up falls within a range from 20 to 50%, and more preferably within a range from 30 to 40%.

When the exposure ratio of Fe is less than 20%, the ratio of Ni in the outermost surface layer is increased so that Ni built up on a mold, and the build-up Ni generates scratches on an outer surface of a can.

On the other hand, when the exposure ratio of Fe exceeds 50%, although the build-up of Ni on a mold can be suppressed, there arises a drawback that rust is extremely liable to occur on a plated steel sheet and hence, this exposure ratio is not preferable.

<Surface Roughness Ra>

After diffusion treatment, the steel sheet is rolled by temper rolling so that mechanical properties are imparted to the steel sheet, and the surface roughness of the Fe–Ni diffusion layer is adjusted to a predetermined roughness.

It is preferable to set the surface roughness Ra of the Fe–Ni diffusion layer to a value which falls within a range from 0.9 to 2.0 µm. The generation of scratches is not observed in the steel sheets having the surface roughness Ra of 0.9 to 2.0 µm.

As the reason for such a result, it is thought that when the surface roughness Ra is less than 0.9 µm, a space which is defined between a steel sheet and a mold and into which lubricant enters at the time of pressing becomes small. It is known that scratches are generated when the lubricant is particularly a water-soluble-emulsion based lubricant.

On the other hand, when the surface roughness Ra exceeds 2.0 µm, since irregularities on the surface of the Fe–Ni diffusion layer becomes large, an iron base material which forms a substrate below the Fe–Ni alloy layer is liable to be exposed. Accordingly, the surface roughness Ra exceeding 2.0 µm is not preferable from a viewpoint of ensuring the corrosion resistance of the steel sheet.

Further, in manufacturing the Ni-plated steel sheet, powder from the roughness roll is largely increased in a surface roughening treatment step so that quality defects such as flaws are generated. Accordingly, the surface roughness Ra exceeding 2.0 µm is not preferable also from a viewpoint of manufacturing the Ni-plated steel sheet.

To prevent scratches, it is necessary to allow a large amount of lubricant to be contained in the space defined between a die of a mold and the steel sheet. A largest amount of build-up of Ni is generated at a point of time that the die is firstly brought into contact with the steel sheet. The die firstly comes into contact with a bottom portion of a can and hence, working is hardly performed on the bottom portion whereby the roughness which the steel sheet has remains. Accordingly, by adjusting the roughness, it is possible to supply an amount of lubricant with which the build-up of Ni can be prevented to a surface of the steel sheet.

<Surface Roughness Ry>

With respect to surface roughness, the surface roughness Ry also exhibits the tendency similar to the tendency of the surface roughness Ra. It is preferable to set the surface roughness Ry to a value which falls within a range of 4.0 to 15 µm. The reason why an upper limit and a lower limit of the range of the surface roughness Ry is decided is as same as the reason set forth in conjunction with the surface roughness Ra.

That is, the generation of scratches is not observed in the steel sheets having the surface roughness Ry of 4.0 to 15 µm.

As the reason for such a result, it is thought that when the surface roughness Ry is less than 4.0 µm, a space which is defined between a steel sheet and a mold and into which lubricant enters at the time of pressing becomes small. It is known that scratches are generated when the lubricant is particularly a water-soluble-emulsion based lubricant. The range of the surface roughness Ry is defined in the substantially same reason as the reason for defining the range of the surface roughness Ra.

On the other hand, when the surface roughness Ry exceeds 15 µm, since irregularities on the surface of Fe–Ni diffusion layer becomes large, an iron base material which forms a substrate below the Fe–Ni alloy layer is liable to be exposed. Accordingly, the surface roughness Ry exceeding 15 µm is not preferable from a viewpoint of ensuring the corrosion resistance of the steel sheet.

<Definitions of Ra, Ry>

Definitions of Ra, Ry are described in JIS B0601-1994. Ra is an arithmetic average height of a roughness curve and an average value of absolute value deviations from an average line, and Ry is a maximum height and indicates a height from the lowermost bottom part to the uppermost top part for every reference length.

<Measuring Method of Ra, Ry>

Measuring methods of Ra, Ry are not specifically limited provided that a roughness meter adopting a traceable surface roughness measuring method is used. A measurement device is based on the description of JIS-B0651-2001.

Although no other conditions are particularly specified with respect to the measuring methods except for that measurement is performed using the traceable surface roughness measurement device which is calibrated in accordance with a reference version, the measurement is performed as follows in the present invention.

One example of measuring method is described as follows.

As the measurement device, a traceable surface roughness measurement device (surfcom series) made by TOKYO SEMITSU CO., LTD. is used. JIS '94 is adopted as the measuring condition. That is, the measurement is performed under the conditions where an evaluation length: 5 mm, a measuring speed: 0.4 mm/sec, a cut-off value: 1.0 mm, a kind of a filter: Gaussian, a measuring range: ±50 µm, gradient correction: straight, and a cut-off ratio: 400.

The surface roughnesses Ra, Ry depend on rolling roughness and a rolling load in a temper rolling step.

The larger the rolling roughness, the larger the roughness of the plated steel sheet to be rolled by temper rolling becomes, while the larger the rolling load, the larger the roughness of an outermost surface of the plated steel sheet becomes.

It is possible to adjust the roughness of the outermost surface of the plated steel sheet by adjusting the rolling roughness and the rolling load.

Rolls used for temper rolling are not specifically limited, and EDT rolls can also be used besides shot dull rolls. That is, the rolls for temper rolling are not specifically limited provided that a method where the roughness falls within a range called for in Claims is adopted. Further, a temper rolling facility is not also specifically limited.

<Forming of Battery Can>

Next, a battery can is formed using a Ni-plated steel sheet manufactured by a manufacturing method of the present invention.

A method of forming a battery can is forming by drawing. Usually, water-soluble emersion is used as a press lubrication material. A Ni-plated steel sheet is formed into a cup in a first step and, thereafter, the cup is formed so as to have a diameter of a battery can through drawing in three to six stages in total, and the cup is formed into a battery can through further four stages.

As a press forming condition, the battery can is formed such that a thickness of a can wall is gradually increased in the direction toward an opening part of the battery can on which a negative pole cap is mounted from a bottom (positive pole terminal part) of the battery can.

That is, the can is molded such that the thickness of the can wall in each step is gradually increased toward the opening part from the bottom of the can.

As a material of the mold used for such press forming, sintered hard alloy is preferably used. However, the material of the mold is not specifically limited. In the present invention, materials described in Table 1 can be used.

In the materials shown in Table 1, among sintered hard alloys used for forming a mold for press forming, an alloy which particularly apts to generate scratches on the battery can is an alloy which contains Ni as a binder.

When an Ni binder is used, Ni in the steel sheet surface layer and Ni in the mold alloy cause sticking thus increasing a possibility that a build-up of Ni is formed.

Further, it is also found that seized Ni generates flaws on an outer surface of a can thus forming scratches.

Ni binder sintered hard alloys are indicated by WC–Ni (see Table 1).

TABLE 1

| kind of material | composition | density g/m$^2$ | hardness HrA | resistance force GPa | compressive strength GPa | Young's modulus GPa | thermal conductivity W/m · K |
|---|---|---|---|---|---|---|---|
| G3 | WC—Co | 14.7 | 89.5 | 2.6 | 4.7 | 579 | 71 |
| NR8 | WC—Ni | 14.8 | 90 | 2.3 | 4.2 | 600 | 75 |
| NR11 | WC—Ni | 13.5 | 90 | 2.4 | 4.6 | 530 | 63 |
| NM15 | WC—Ni | 14 | 86.5 | 2.5 | 3.5 | 530 | 50 |
| RCCL | WC—TiC—TaC | 14.7 | 93 | 1 | 3.6 | 640 | 70 |
| TM2 | Ti—TiC—Mo | 5.2 | 54 | 0.7 | — | 250 | 9.2 |
| TW3 | Ti—TiC—Mo—W | 5.5-5.8 | 68 | 0.5 | — | 226 | 9.2 |
| DUX40 | TiC—Ni | 6.5 | 91.5 | 1.8 | 3.9 | 470 | 29 |
| SiC | SiC | 3.2 | 94 | 0.6 | 3.5 | 441 | 46 |
| Si$_3$N$_4$ | Si$_3$N$_4$ | 3.3 | 92.8 | 1.1 | 4 | 314 | 25.1 |

As a lubricant for preventing sticking generally used in press forming, the following water-soluble emersion is named. Si$_3$N$_4$ With the use of such water-soluble emersion, hot water can be used for cleaning after forming a can so that it is unnecessary to use an organic solvent whereby cleaning can be easily performed while taking into account the environment.

<Composition Examples of Water-Soluble Emulsion

| component | blending | specific name of component |
|---|---|---|
| mineral oil | 40-50% | mineral oil or fatty acid ester |
| higher alcohol | 10% | t-butyl alcohol |
| surface-active agent | 5% | anionic or nonionic surface-active agent |
| alkanolamine | 5-10% | triethanolamine |
| inhibitor | 1% | benzotriazole |
| water | balance | |

Liquid having the above-mentioned composition is mixed, and is further diluted with water thus producing water-soluble emersion having the concentration of 2 to 10%.

EXAMPLES

The present invention is explained hereinafter in further detail using examples.

FIG. 1 is a cross-sectional constitutional view of a Ni-plated steel sheet of the example where scratches are not generated, and FIG. 2 is a cross-sectional constitutional view of a Ni-plated steel sheet of a comparison example where scratches are generated.

Example 1

A low carbon aluminum-killed steel sheet having a sheet thickness of 0.25 mm and after being treated by cold-rolling and annealing is used as an original sheet.

The composition of a steel sheet which constitutes the original sheet is as follows.

C: 0.045%, Mn: 0.23%, Si: 0.02%, P: 0.012%, S: 0.009%, Al: 0.063%, N: 0.0036%, balance: Fe and inevitable impurities The steel sheet is subjected to alkali electrolytic cleaning and pickling by immersion into a sulfuric acid and, thereafter, Ni plating is applied to the steel sheet under a condition of watt bath matte plating.

A Ni plating adhesion amount is set to 0.3 μm. After Ni performing Ni plating, the steel sheet is subjected to water cleaning and drying. Then, the steel sheet is subjected to heat treatment in a gas atmosphere furnace with an HNX gas (dew point: −20° C.) containing 6.5% of hydrogen at a heating temperature of 580° C. for a soaking period of 6 hours and, subsequently, the steel sheet is subjected to temper rolling with elongation of 1.2%.

A thickness of the obtained Fe–Ni diffusion layer is 0.5 μm.

As the result, an amount of free Ni, a thickness of Fe–Ni diffusion layer, a Fe exposure ratio (%) and surface roughnesses (Ra, Ry) of the obtained Ni-plated steel sheet are shown in Table 2.

Examples 2 to 15

Ni-plated steel sheets are obtained in the same manner as the example 1 except for that a Ni plating adhesion amount is changed to values shown in Table 2.

A heat treatment temperature and a heat treatment time are changed in a gas atmosphere furnace, and heat treatment condition is controlled such that thicknesses and iron exposure ratios of various Fe–Ni diffusion layers are obtained. As the result, an amount of free Ni, a thickness of Fe–Ni diffusion layer, a Fe exposure ratio (%) and surface roughnesses (Ra, Ry) of the obtained Ni-plated steel sheet are shown in Table 2.

TABLE 2

| | free Ni (m) | Fe–Ni diffusion thickness (m) | Fe exposure (%) | coating amount of Ni plating | surface roughness Ra (m) | surface roughness Ry (m) | result of generation of scratches | thermal diffusion |
|---|---|---|---|---|---|---|---|---|
| example 1 | 0 | 0.5 | 20 | 0.30 | 0.9 | 4.0 | not present | present |
| example 2 | 0 | 2.0 | 25 | 0.80 | 1.1 | 8.0 | not present | present |
| example 3 | 0 | 1.5 | 20 | 1.0 | 1.5 | 10 | not present | present |
| example 4 | 0 | 0.5 | 50 | 0.15 | 1.7 | 13 | not present | present |
| example 5 | 0 | 3.0 | 40 | 1.0 | 2.0 | 15 | not present | present |
| example 6 | 0 | 0.5 | 35 | 0.3 | 1.0 | 4.0 | not present | present |
| example 7 | 0 | 5.0 | 50 | 1.5 | 1.0 | 6.0 | not present | present |
| example 8 | 0 | 5.0 | 50 | 1.7 | 1.9 | 15 | not present | present |
| example 9 | 0 | 5.0 | 20 | 2.0 | 1.0 | 6.0 | not present | present |
| example 10 | 0 | 2.5 | 20 | 1.5 | 1.9 | 15 | not present | present |
| example 11 | 0 | 0.7 | 50 | 0.30 | 0.9 | 5.0 | not present | present |
| example 12 | 0 | 1.7 | 22 | 0.90 | 1.3 | 8.5 | not present | present |
| example 13 | 0 | 2.0 | 30 | 1.0 | 1.7 | 13 | not present | present |
| example 14 | 0 | 0.6 | 50 | 0.15 | 1.5 | 10 | not present | present |
| example 15 | 0 | 0.7 | 50 | 0.3 | 1.9 | 14 | not present | present |
| comparison example 1 | 0 | 0.5 | 15 | 0.30 | 1.2 | 8.0 | present | present |
| comparison example 2 | 0.3 | 0.5 | 5 | 1.0 | 1.5 | 10 | present | present |
| comparison example 3 | 0 | 0 | 0 | 0.2 | 1.5 | 13 | present | not present |
| comparison example 4 | 0 | 0.7 | 35 | 0.3 | 0.8 | 3.5 | present | present |
| comparison example 5 | 0 | 0.6 | 50 | 0.15 | 0.7 | 3.0 | present | present |
| comparison example 6 | 0.1 | 1.5 | 10 | 1.0 | 1.7 | 13 | present | present |

<Forming of Battery Can>

A battery can for AA size alkali battery is formed by drawing the Ni-plated steel sheets described in examples 1 to 15 using the above-mentioned water-soluble emersion.

The forming is performed through 10 steps, wherein the Ni-plated steel sheet is subjected to drawing and ironing such that a cup has an outer diameter of a battery can through 1 to 6 steps, and the cup is subjected to shoulder forming, final shoulder forming, step forming and cutting of ears through 7 to 8 steps thus forming a battery can. A press operation is performed by transfer drawing and ironing.

A material of apart of a mold which is brought into contact with the steel sheet is made of a WC-Ni material (NR-8) which uses a Ni binder.

first step
  cupping
  cup diameter: φ31.42 mm
  drawing ratio: 1.85
  blank diameter: φ58 mm
second step
  drawing: φ25.60 mm
  drawing ratio: 1.23
third step
  drawing: φ21.52 mm
  drawing ratio: 1.19
fourth step
  drawing: φ18.52 mm
  drawing ratio: 1.16
fifth step
  drawing: φ15.52 mm
  drawing ratio: 1.19
sixth step
  drawing, barrel forming: φ13.3 mm
  drawing ratio: 1.17
seventh to tenth steps
  An AA size battery can is formed after shoulder forming, final shoulder forming, step forming and cutting of ears.

An outer surface of the battery can is observed after the sixth step at which drawing is finished, and the generation of scratches is checked.

The result of checking is shown in "result of generation of scratches" in Table 2.

A thickness of a Fe–Ni diffusion layer is obtained by a GDS analysis, and a Fe/Fe+Ni ratio of an outermost surface layer, that is, an amount of Fe present in an outermost surface layer is measured by an Auger analysis.

Comparison Example

Ni-plated steel sheets of comparison examples 1 to 6 are prepared, and AA size battery cans are formed in the same manner as the examples.

<Evaluation>

The Ni-plated steel sheets of the examples 1 to 15 which fall within the scope of the present invention exhibit no generation of scratches as can be clearly understood from Table 2 and hence, these Ni-plated steel sheet are used as excellent Ni-plated steel sheet for forming battery cans.

On the other hand, the Ni-plated steel sheets of the comparison examples 1 to 6 which do not fall within the scope of the present invention exhibit the generation of scratches and hence, these Ni-plated steel sheets do not have practicability.

Although the Ni-plated steel sheet where the Fe–Ni diffusion layer is formed on a surface of the steel sheet is used in the examples, the Fe–Ni diffusion layer may be formed on an outermost surface layer, and surface roughness and a ratio of Fe may be set to the above-mentioned values.

Accordingly, another layer may be provided between the Fe–Ne diffusion layer and the steel sheet.

INDUSTRIAL APPLICABILITY

According to the present invention, a Ni-plated steel sheet where the generation of scratches at the time of forming a battery can is suppressed and a method of manufacturing a battery can which uses such a Ni-plated steel sheet are provided and hence, the present invention possesses an extremely high industrial applicability.

The invention claimed is:

1. An Ni-plated steel sheet having a Fe–Ni diffusion layer on an outermost surface layer, wherein
a surface roughness Ra is 0.9 to 2.0 µm,
a surface roughness Ry is 4.0 to 15 µm, and
a ratio between Fe and Ni in the Fe–Ni diffusion layer is set such that Fe accounts for 20 to 50% in an Auger analysis.

2. The Ni-plated steel sheet according to claim 1, wherein the Ni-plated steel sheet is a Ni-plated steel sheet for manufacturing a battery can which is formed by drawing using a liquid which containing water-soluble emulsion as a press liquid.

3. A method of manufacturing a Ni-plated steel sheet comprising the steps of:
applying Ni plating to a surface of a steel sheet with a Ni coating amount of 0.3 to 2 µm;
forming a Fe–Ni diffusion layer on an outermost surface layer of the Ni-plated steel sheet by heating the Ni-plated steel sheet at a temperature of 600 to 800° C. such that a ratio between Fe and Ni in the Fe–Ni diffusion layer is set such that Fe accounts for 20 to 50% in an Auger analysis; and
applying temper rolling to the steel sheet thus setting a surface roughness Ra of the Fe–Ni diffusion layer to 0.9 to 2.0 µm and a surface roughness Ry of the Fe–Ni diffusion layer to 4.0 to 15 µm.

4. A method of manufacturing a battery can where an Ni-plated steel sheet which has a Fe–Ni diffusion layer on an outermost surface layer and in which the Fe–Ni diffusion layer has a surface roughness Ra of 0.9 to 2.0 µm and a surface roughness Ry of 4.0 to 15 µm and the Fe–Ni diffusion layer has such a Fe/Ni ratio that Fe accounts for 20 to 50% in an Auger analysis is subjected to drawing using a water-soluble liquid which contains water-soluble emersion as a press lubricant.

* * * * *